Dec. 1, 1953 M. E. BARBER Re. 23,748

COMPRESSION BY-PASS AND WRENCH DEVICE

Original Filed Dec 11, 1948

MERLIN E. BARBER
INVENTOR.

BY
G. Lorenz Miller

Reissued Dec. 1, 1953

Re. 23,748

UNITED STATES PATENT OFFICE 23,748

COMPRESSION BY-PASS AND WRENCH DEVICE

Merlin E. Barber, Decatur, Ill.

Original No. 2,543,954, dated March 6, 1951, Serial No. 64,780, December 11, 1948. Application for reissue February 28, 1952, Serial No. 273,938

5 Claims. (Cl. 285—22)

Matter enclosed in heavy brackets [ ] appears in the original patent but forms no part of this reissue specification; matter printed in italics indicates the additions made by reissue.

This invention relates to pipe fittings and more particularly to one that is insertable as a safe and reliable by-pass or conductor of the fluid in a leaking gas or other service pipe or in one before it becomes leaky, the same to be applied either in full and entire replacement or in part repair of the original pipe.

One object of the invention is to produce an efficient and effective, practical device that is not only simple in construction and arrangement and inexpensive to produce but is also easily installed and removed as may be desired or necessary.

Another object is to construct and arrange the device as a unitary assembly in itself and in such manner that it is insertable in the service pipe from within a house or other building and requires no excavation outside, except, possibly, a small opening directly at the location of the supply main and then only in case a full service installation is to be made and it is thus, of course, necessary to disconnect the old service pipe from the main and connect thereto a substitute length of conductor pipe which is attached communicably to and extended from the outer end of the fitting unit proper.

A further object is to provide a special wrench device which is easily inserted and operated in the by-pass fitting for the installation of the fitting and removed after the installation is made.

Other objects and advantages to be attained will appear in the following description.

A practical but non-limiting illustration of the invention is shown in the accompanying drawings, in which.

Figure 1:
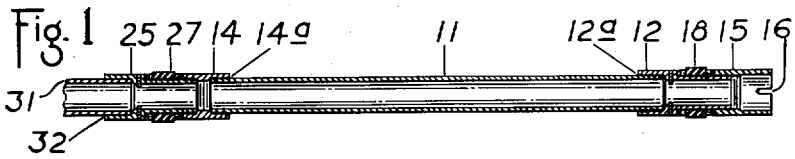
Figure 1 is a longitudinal sectional view of the unitary by-pass fitting removed from the service pipe.
Figure 4:
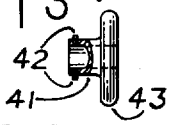
Figure 4 is a similar view of a still shorter outer tubular wrench member placeable freely rotatable and longitudinally slidable on the intermediate wrench member.
Figure 2:
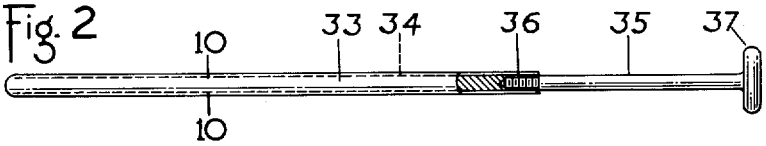
Figure 2 is a major side elevational and part longitudinal sectional view of a special elongated inner wrench member detached but insertable in the unitary fitting assembly for effecting the setting of the fitting in and its removal from the service pipe.
Figure 5:
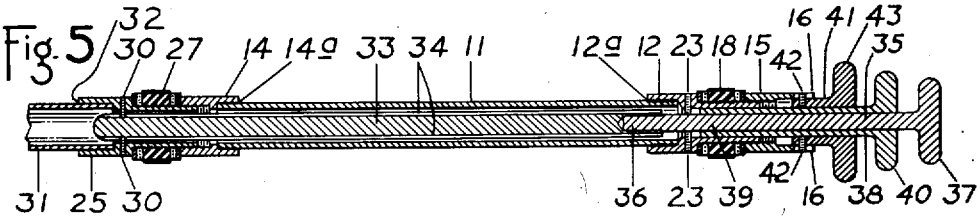
Figure 5 is a longitudinal section, on an enlarged scale, showing the three wrench members assembled cooperatively and inserted for operation in the unitary fitting assembly.
Figure 6:
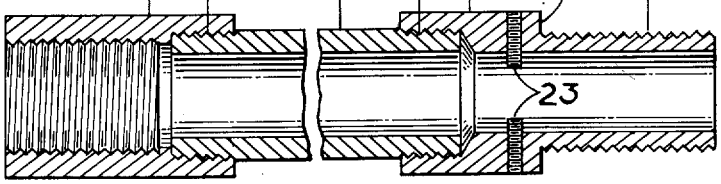
Figure 6 is a further enlarged, fragmentary, longitudinal sectional view of the intermediate main body tube and the two opposite end members which, in practice, are soldered, welded or otherwise fixedly and strongly secured to said main body tube, the one end member being an internally screw-threaded nipple and the other an externally screw-threaded nozzle element.
Figure 7:
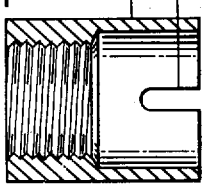
Figure 8:
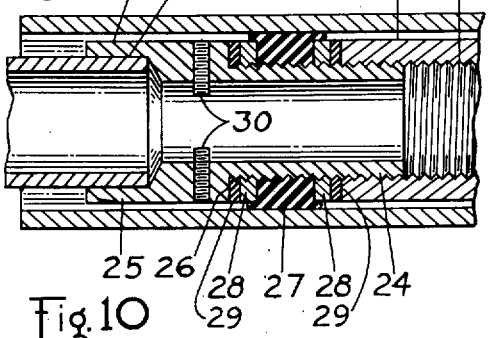
Figure 9:
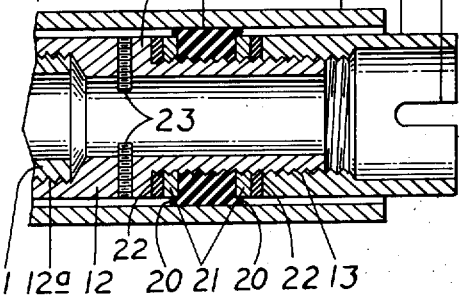
Figure 10:
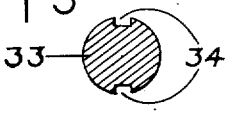

Figure 7 is a longitudinal section of an internally threaded outer end collar, shown detached, but, when used, to be received rotatably fitted and longitudinally adjustable on the nozzle element shown in Figure 6, so as to clamp, compress longitudinally, and cause body-deforming flow radially and annularly, of a gasket ring slipped on said nozzle element to seal the by-pass fitting in the service pipe to which it is placed in use;

Figure 8 is a fragmentary longitudinal sectional view, on an enlarged scale, of the left-hand end portion of the fitting assembly of Figures 1 and 5, but with the assembly installed in the service pipe and the adjacent gasket ring deformably compressed endwise and spread radially and annularly into sealing engagement with the surrounding adjacent interior wall face of the service pipe;

Figure 9 is a view similar to that of Figure 8 but of the right-hand end portion as installed and sealed within the end portion of the service that, in practice, is usually located inside the building; and Figure 10 is a cross-section of the main stem portion of the elongated inner wrench member, taken on or about the line 10—10 of Figure 2.

It is here noted that gas service pipes running to the house or building from the main laid in the street or ground outside are usually made of iron or steel. Hence, in time, they become defective from corrosion, making at least partial and sometimes full replacement necessary, the accomplishment of which has heretofore required the digging of a trench outside and sometimes all the way from the premises to the location where the service line is tapped to the main. This entails considerable expense as well as the attending annoyance and the time consumed in making the repair or replacement. The present invention, therefore, is designed to make it unnecessary in some cases to do any outside excavating at all, and even if it becomes necessary to dig, then only a small opening in the ground at the location where the service line is connected to the main.

It is futher noted that, in accordance with the present invention, as will herein later more fully appear in detail, a by-pass fitting is produced as a complete unit in itself and of an overall length so that, when applied in use, it extends through the wall with its inner end inside and its outer end an appreciable distance outside the building. In this connection, too, there is a provision of two particular annular gaskets, one adjacent each end of the unit, with means for tightening the same against the adjacent surrounding interior wall face portions of the old service pipe so as to retain the inserted by-pass unit in place and at the same time seal the space between the unit and the service pipe wall. These gaskets, while serving to hold the applied by-pass unit in place, further afford an effective double seal, one outside the building wall so that, ordinarily, it alone prevents passage of any escaping gas outside from entering the building through the space between the by-pass and the wall of the old service pipe, but the inner gasket is there to check any seepage of gas that may, but hardly, if ever, get by the outer seal.

Referring now to the accompanying drawings in detail, the unitary fitting assembly shown in Figures 1 and 5, comprises a main body tube 11, preferably of copper. This tube (see Figure 6 for clearer detail) has secured at one end (usually the inner end) an end member 12, preferably of brass, the attachment between the parts being by a soldering or welding process or by any other approved fixedly fastening means. This end member 12 has an externally screw-threaded, reduced nozzle portion 13 and it is axially bored for fluid flow communication with the tubular body 11.

At the opposite end (the outer end) of the tubular body 11 is fixedly secured, as by soldering, welding or other approved means, like the member 12, an internally threaded collar member 14, also preferably of brass.

The fitting together of the body tube 11 and the end parts 12 and 14, prior to the soldering or other fixedly fastening procedure, may be and by preference usually is by a screw-threaded engagement as indicated at 12a and 14a in Figure 6. However, the preliminary connection may be by a plain slip-fitting of the parts, but, in any case, the attachment of the parts 12 and 14 to the body tube 11 must be fixedly secure and strong, as these three parts, as a unit in themselves, are like a one-piece integral structure and in use are not movable independently of each other, whereas the several other parts to be hereinafter described are movable upon these parts 11, 12 and 14, and independently of each other.

Fitted rotatably and movable lengthwise on the nipple portion 13 of the end member 12 is an internally screw-threaded, open-ended, tubular cap member or collar 15 which works like a nut and has its outer end portion notched diametrically, as at 16, for the engagement of a key or a special wrench part to be later more fully described.

Sleeved normally freely movable on the nipple portion 13 of the end member 12, between an annular shoulder 17 at the base of said portion 13 (see Figure 6 for a clearer showing of the shoulder) and the inner end of said member 15 (shown in detail and detached in Figure 7) is a gasket ring 18 of a resilient material of the character of rubber which is not only non-porous and fluid-resistant but is of long and indefinite lasting quality so that it withstands the action of the atmospheric elements and the gas or fluid that is conducted in the service pipe in which the by-pass of the present invention is applied in use.

Normally, as indicated in Figures 1 and 5 of the drawings, the gasket ring 18 is plain square in body cross-section, but when the by-pass fitting is inserted in the service pipe, as represented in Figure 9 for example and designated by the reference numeral 19, and the collar member 15 is turned and moved inwardly on the nipple portion 13 of the end member 12, said gasket ring 18 is squeezed longitudinally and expanded radially and annularly into sealing contact all around with the directly opposed interior face portion of the service pipe 19. In this compression and resultant body flow and deformation of the gasket ring the peripheral portion thereof is spread appreciably endwise, and at opposite ends of the ring, as at 20 (see Figure 9 for illustration) so that it effects a seal more assuredly.

Preferably as shown (see Figure 9) leather washers 21 are placed directly against the opposite ends of the gasket ring 18, and between these washers and the shoulder 17 of the part 12 and the inner end of the collar member 15 metal washers 22 are respectively interposed, the leather and metal washers obviously to minimize liability of damage to the gasket ring as the collar member 15 is rotated and moved into its clamping relation to said ring, the metal washers 22, of course, taking the brunt of the rubbing action as metal against metal instead of metal directly against rubber, and the interposed leather washers serving effectively as a cushioning pad or buffer.

As shown more clearly in Figures 6 and 9, the end member 12 which is soldered or otherwise fixedly and strongly secured to the main body tube 11, as hereinbefore described, is provided internally and at some distance inwardly from its outer end with a pair of diametrically opposed rigid lugs or studs 23 of ample strength for slidable but duly secure holding engagement with a working part of the hereinafter described wrench device.

Fitted rotatably and longitudinally movable in the collar member 14 at the outer end of the tubular main body member 11, is the reduced, externally screw-threaded, nipple portion 24 of an axially bored fitting 25, preferably of brass, as are the several other hereinbefore described members 12, 14 and 15. This member 25, as shown, has an annular shoulder 26 (see Figure 8) at the base of the nipple portion 24, between which and the outer end of the end collar member 14, a gasket ring 27, similar to the hereinbefore described ring 18, is placed, said ring 27 having leather washers 28 and metal washers 29 at opposite sides thereof, like the hereinbefore described washers 21 and 22. This fitting 25 is provided near its outer end with a pair of diametrically opposite lugs or studs 30 internally thereof, like those 23 in the end member 12 but for engagement by the main part of the wrench device to be presently described in connection with manipulation of the parts 12 and 15 of the by-pass assembly.

It is here noted that the gasket ring 27 (see Figure 8) is compressed endwise and deformed with radial and annular expansion into sealing engagement with the wall of the service pipe 19 like the ring 18 when the by-pass unit is applied in use (see Figures 8 and 9 for comparison).

It is further noted that, in all instances where the device of the present invention is installed for use, the unitary by-pass assembly as thus far described is always contained in the outer wall of the building (usually the foundation or basement wall), and, for the purpose, the particular unit used is of an overall length greater than the thickness of the wall, so that the outer end portion of the unit is projected outside and beyond the wall, especially that much of the unit in which the outer gasket ring 27 is contained and inasmuch as this particular sealing provision is primarily intended for preventing seepage of any leaking gas through the wall into the building, whereas the seal afforded by the inner gasket ring 18 is secondary and supplemental to the outer ring 27.

The unitary by-pass assembly, therefore, in practice, may be made in different standard lengths, and it is intended so to do. These lengths, for practical adaptation and use of the invention, should vary, say for example, from a minimum of eighteen inches (18″) up to approximately four feet (4′0″). This will take care of practically all required installations. In this connection, also, inasmuch as the service pipes vary in diameter from a one-inch (1″) average up to four inches (4″) maximum diameter in some cases, the by-pass units of the present invention will be accordingly made in different diameters as well as different lengths.

In some installations (in fact, in many instances) the unitary by-pass alone may be inserted and set with the hereinbefore gasket seal effect in that part of a service pipe which extends through the wall of the building. However, the service pipe may be in such corroded and leaky condition all the way out to the supply main that a full replacement is required or desirable. In this case, of course, a length of copper pipe 31 is soldered, welded or otherwise fastened fixedly and securely, leak-tight, as at 32, to the outer end of the by-pass outer-end-fitting 25 (see Figures 1 and 5, and Figure 8 in particular for clearer illustration). This pipe 31, of course, is unnecessary and not used if the replacement is provided only through the building wall, and, obviously, no excavating is required except when such full length replacement is made, and then only in the ground right at the location where the service pipe is connected to the supply main.

The principal reason for using copper tubing in replacement of the old iron or steel service pipe is because of its high resistance to the action of the atmospheric elements and the gas or fluid passing through the unit.

In addition to this particular advantage, there is the comparative thinness of gauge in which such tubing can be used, with ample and even excess tensile strength, together with its pliability whereby it can be rolled into a bundle of easily handled size and considerable length of tubing that can be readily inserted endwise into the old service pipe and cut off, right at the job, into the needed length to be used. Also, because of the desirability in avoidance of injurious corrosion, brass is used advantageously as the material of which the several fittings provided in the by-pass assembly are made.

The by-pass unitary assembly, of itself, and in the normal condition of its gasket rings, is easily inserted in the service pipe at the inner end thereof and as easily removed therefrom.

So, too, the length of copper tubing 31, if used in the replacement, is inserted at the inner end of the service pipe within the premises, and even pushd outward the full distance to where it is to be connected to the supply main. A mark is then put on the tubing just where it starts protruding from the inner end of the old service pipe inside the building, after which the tubing is pulled out of the service pipe and then cut off at a distance outward from the mark about equal to the length of the by-pass unit.

The inner end portion of the cut-off length of copper tubing 31 is fastened to the outer end of the end fitting 25 of the by-pass unit with ample strength and leak-tight effect as hereinabove described. The so attached tubing is then again inserted endwise in the service pipe until the by-pass unit follows its entire length into the service pipe or until the outer end of the replacement tubing is far enough out for the coupling thereof to the supply main.

It is here noted that, to facilitate insertion of the by-pass unit and the length of copper tubing, if the latter be used, and to obtain better results, after installation, the old service pipe may be reamed to rid its interior of rust and scale.

With the connection of the replacement tubing 31 to the supply main effected and the gasket rings 18 and 27 compressed deformably into sealing contact with the interior wall face of the service pipe, the installation is completed with security against seepage of leaking gas from the service pipe into the premises, for, as herein previously pointed out, the outer gasket ring 27 alone suffices as an effective and reliable seal against passage of gas beyond its location and into the premises, but the inner ring 18 is there located with supplemental effectiveness in the event of a barely possible failure of the ring 27 as a seal.

In addition to the secondary or supplemental sealing effect of the ring 18, there is a special advantage in the provision of rings 18 and 27, the one at the inner end portion of the by-pass unit and the other adjacent its outer end, in that, when the two rings are set in their endwise compressed and radially outward and annularly expanded condition, as indicated in Figures 8 and 9, the by-pass unit is held securely supported in the service pipe 19.

The endwise compression and radially outward and annular expansion of the gasket rings 18 and 27 is effected by the use of a specially provided wrench device as illustrated in Figures 2, 3, 4 and 5. This particular wrench is readily assembled and taken apart as to its own cooperative structural parts and as easily inserted and operated in the by-pass unit and after operation removed from the unit.

As shown, the wrench device comprises an elongated main or inner element in stem-like form, including a major part 33 of a relatively large diameter to enter rather snugly but freely movable in the bore of the by-pass unit, said part 33 (see Figure 10) having diametrically opposite longitudinal grooves 34 in its peripheral portion. These grooves, as indicated in Figures 2 and 5, extend the entire length of said part 33 and they are open-ended at both ends of the part.

This main or inner wrench element carries, sleeved and freely movable thereon, a second or intermediate cooperative member and a third or outer member, also cooperatively thereon. For this reason, the major part 33 has a separate axial stem extension 35 detachably but strongly secured to its outer end portion, as at 36, in any suitable manner, but preferably by left-hand screw threading, for a special reason to be later described with due particularity. As shown, this axial extension 35 is provided at its outer end with a knob 37 for handling and manipulating the wrench device.

Figure 3:
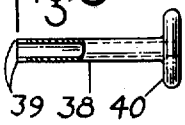
Figure 3 is a partial side elevation and longitudinal section of a shorter intermediate tubular wrench member placeable cooperatively longitudinally and rotatably slidable on the elongated inner wrench member.

The cooperative secondary or intermediate wrench member, designated by the numeral 38, comprises a tubular, open-ended stem portion, the forward end thereof having diametrically opposite key-notches 39 formed therein and a knob 40 being provided at its outer end (see Figure 3 for detail showing of said notches). This member 38 fits rotatably and longitudinally slidable on the part 35 of the main or inner element of the wrench device.

An axially bored and open-ended third or outer wrench member 41 (shown in detail and detached in Figure 4) is fittable freely rotatable and longitudinally slidable on said secondary or intermediate member 38. It is provided at its forward end with a pair of diametrically opposed, outwardly projected, peripheral key-studs 42, and a knob 43 is provided on its outer end.

The wrench device, including the parts just above described, is shown in Figure 5 as assembled for use and inserted operatively in the unitary by-pass of the present invention.

For operation, the assembled wrench device has its stem part 33 inserted ahead into the by-pass unit at the inner end thereof, the longitudinal grooves 34 of said stem part riding first across the studs 23 of the by-pass member 12 and clearing said studs as the forward ends of the grooves 34 come into a key-engagement with the studs 30 of the fitting 25 near the outer end of the by-pass unit. With the part 33 thus engaged at its forward end portion with the studs 30, the wrench member 38 is then moved on the stem part 35 until the end notches 39 of said member 38 are in key-engagement with the studs 23 of the by-pass member 12.

The wrench device is now placed ready for the clamping and setting of the outer gasket ring 27 in sealing relation to the old service pipe 19 as indicated in Figure 8 of the drawings. This may be accomplished by either one of two ways. First, if no appreciable length, if any replacement tubing 31 at all is attached to the outer fitting 25, the engaged main or inner wrench element may be grasped by its knob 37 and turned forcibly counter-clockwise while holding from movement the secondary or intermediate wrench member 38 which is key-engaged with the by-pass member 12 so that the unitary by-pass assembly, up to the outer end collar 14, is in turn held from rotation. Thus, the fitting 25 is screwed into the member 14 and thereby compresses the gasket ring 27. Secondly, if a preponderant length of the copper tubing 31 is attached to the fitting 25 and extends therefrom a considerable distance out, in the old service pipe 19, the main or inner element is held from rotation, thereby likewise holding the fitting 25, and the secondary or intermediate wrench member 38 is grasped by its knob 40 and turned forcibly clockwise, thereby likewise rotating the key-engaged end member 12 and the rest of the intersecured by-pass unit parts up to the end collar 14, whereby said member 14 is screwed on the nipple portion 24 of the fitting 25 and the gasket ring 27 is thereby compressed.

It is here noted that the reason for providing the left-hand screw-threaded attachment 36 of the wrench part 35 to the part 33, as sometime hereinbefore described, is because the wrench device is inserted in the by-pass unit at the inner end thereof and the device is handled and manipulated at that end, thereby making it necessary that the main or inner wrench element assembly, including the two joined parts 33 and 35, be rotated counter-clockwise in its operation for screwing the fitting 25 clockwise of itself into the by-pass collar 14 at the outer end of the by-pass assembly, and for preventing unscrewing of the joined parts 33 and 35 when they are not to be rotated but it is necessary for them to hold the fitting 25 from rotation while the wrench member 38 is being rotated clockwise to likewise turn the key-attached by-pass assembly and thereby screw the end collar member 14 on the fitting 25 to compress the gasket ring 27.

With the gasket ring 27 placed in by-pass-holding and sealing contact with the old service pipe 19, the other gasket ring 18 is readily compressed into holding and sealing condition like the ring 27 (see Figure 9). This is accomplished by holding the secondary or intermediate wrench member 38 and the key-engaged by-pass end member 12 from rotation and moving the third or outer wrench member 41 with its key-studs 42 into locking engagement in the end notches 16 of the nut-like cap-collar 15, and then rotating the wrench member 41 forcibly clockwise to thereby turn the by-pass member 15 so as to screw it on the end member 12 and compress the gasket ring 18.

With the by-pass unit placed in the service pipe and the gasket rings set in holding and sealing condition as indicated in Figures 8 and 9, the wrench device is withdrawn and the bore of the by-pass unit is then clear of obstruction so that the gas or other fluid to be taken care of can flow freely therethrough and with no leakage and seepage of the gas or fluid into the premises.

To remove the installed by-pass from the service pipe the same wrench device may be used, of course, by reversing the rotation of the driving parts thereof. In this connection, however, some provision must be made to prevent unscrewing of the left-hand screw-threaded attachment 36 of the part 35 to the part 33. This may be obviously taken care of by making the threaded attachment extra tight and possibly with some known jam-nut or lock-nut provision for example, or by any other obvious and approved means which in itself is not a part of the present invention.

It is apparent that a practical and effective by-pass unit is provided by the present invention and one which can be used safely and to good advantage either alone, as a replacement in a service pipe only where it passes through the wall of a building, or, if the service pipe has become so corroded that it is defective and leaky for some length thereof outside and beyond the wall of the building, even all the way to the supply main in the street, a replacement tube attached communicably to the outer end of the by-pass unit is easily inserted in the end of the service pipe from within the building and shoved far enough for its outer end to be connected to the main.

In any case, the old service pipe is left in the ground and also left in place where it goes through the wall of the building, and while it is now out of service as a conductor of the gas or fluid for which it previously was used, it does serve as a somewhat protective and supporting casing for the replacement parts of the present invention. In this way, too, as hereinbefore stated, no excavation outside the building is necessary, except only at the location where the replacement tube 31 is, in some instances, to be tapped into the supply main. So, too, should there be a leak at the main, any escaping gas entering the old service pipe and traveling in the space surrounding the inserted replacement tube 31, can get no farther than the outer gasket ring 27 which is located outside the building. Hence, the chances of seepage of gas from the outside into the building are practically nil, and there is but little, if any, liability of giving way and failure of said ring 27, because of the provision of the second ring 18 and the two rings being located one each at opposite ends of the by-pass so as to support it steadily and free from such vibratory and torsional movements that might tend to work the one particular gasket ring 27 loose from its effectively set sealing relation to the wall of the old service pipe.

It is here noted that, after installation of the by-pass unit and such additional replacement parts as necessarily used, the inner ends of the by-pass unit and old service pipe are then obviously connected to the meter inside the building and to the distributory house-piping. This is not shown in the drawings, because the details thereof, in themselves, are not of the present invention.

Obviously, modification and change may be made in the construction and arrangement of the unitary by-pass assembly and in the wrench device without departing from the spirit of the invention as defined in the appended claims. Therefore, the invention is not limited to the specific construction and arrangement shown in the accompanying drawings.

What is claimed is:

[1. A replacement for gas service pipes and the like, the same including a unitary open-ended tubular by-pass fitting inserted in the old service pipe, said fitting having adjacent each end a surrounding holding and sealing gasket expansible radially and annularly outward into holding and sealing contact against the adjacent inner wall face of the service pipe, with means in the fitting as a structural part thereof for creating such expansion, said expansion-creating means being actuated for both the expanding effect and reversely thereof by a removable wrench device insertable for operation in said fitting.]

[2. A replacement for gas service pipes and the like, as set forth in claim 1, wherein the holding and sealing gasket is an elastic ring of the character of rubber and normally is retracted out of holding and sealing contact with the service pipe, the means of creating the expansion of the gasket ring at each end of the by-pass fitting comprises a stationary shoulder on the fitting and an opposed longitudinally adjustable member between which the gasket ring is placed and compressed endwise and expanded radially and angularly outward, and said longitudinally adjustable expansion-creating member and the removable wrench device having releasable inter-engaging portions whereby operation of the applied wrench device in one direction actuates the longitudinally adjustable member to effect the said compression and expansion of the gasket ring and a reverse operation of the wrench device actuates the longitudinally adjustable member to relieve the gasket ring of such compression and expansion.]

[3. A replacement for gas service pipes and the like, the same including a unitary open-ended tubular by-pass fitting inserted in the old service pipe, said fitting being located in that portion of the service pipe which is passed through the wall into a building and the outer end portion of the fitting is some distance outside the wall, the fitting having externally on its outer end portion, and also outside the wall, a ring-like holding and sealing gasket expansible radially outward and annularly into contact with the adjacent interior wall face of the service pipe so as to close and seal the space between the fitting and the service pipe.]

[4. A replacement for gas service pipes and the like, as set forth in claim 3, wherein the by-pass fitting is of a length whereby, with its outer end portion extended a distance outside the wall of the building, its inner end is in near proximity to the inner face of the wall, and a second holding and sealing gasket, similar to the outer gasket, is provided around the inner end portion of the fitting for effecting a duplicate sealing of the adjacent space between the fitting and the service pipe and the two so applied gaskets holding the fitting steadily effective in place.]

5. A replacement for gas service pipes and the like, the same comprising an open-ended unitary by-pass assembly consisting of an intermediate body tube having fixedly secured at its inner end an axially bored member provided with an externally screw-threaded reduced nipple extension at its end with an annular abutment shoulder at the base of the nipple extension, said axially bored end member having diametrical key-stud provision internally thereof, a cap-collar internally threaded at one end portion and fitted adjustably on said nipple extension so as to compress an interposed rubber-like gasket ring endwise against the abutment shoulder at the base of the nipple extension, said cap-collar having its other end key-notched diametrically, the intermediate body tube having fixedly secured at its outer end an internally threaded collar member, and an axially bored end-fitting having an inwardly projected and externally threaded nipple extension with an annular abutment shoulder at the base thereof, said nipple extension fitted adjustably in the threaded interior of the collar member fixed on said intermediate body tube and having internal diametrical key-stud provision similar to that of said axially bored end member at the inner end of the by-pass assembly, the annular abutment shoulder of said outer end-fitting compressing an interposed second rubber-like gasket ring endwise against the outer end of said outer end-collar on the intermediate body tube when said fitting is screwed into the collar, the gasket rings of said by-pass assembly being compressed by the insertion of an elongated removable wrench device into the assembly at the inner end thereof and having separate holding and rotating members with releasable provision for interlocking engagement respectively with the internal key-stud provisions of the axially bored outer end-fitting and that of the axially bored inner member which is fixedly attached to the intermediate body tube and also the key-notches of the cap-collar at the inner end of the by-pass assembly.

6. An insertable and removable wrench device for a replacement by-pass fitting such as that herein described, said wrench device to be inserted at the inner end of the by-pass fitting and comprising an elongated main or inner stem-like member grooved externally longitudinally thereof, the grooving to ride first across the internal key-stud provision adjacent the inner end of the by-pass fitting, then clearing such stud provision, the forward end portion of the grooving after such clearance of the wrench part interlockingly engaging the internal key-stud provision adjacent the outer end of the by-pass fitting, said main or inner stem-like wrench member having an axial rearward extension of lesser diameter than its longitudinally grooved major forward portion, said extension having an intermediate or second, axially bored, stem-like wrench member fitted freely longitudinally slidable and rotatable thereon with key-notch provision at its forward end for interlocking engagement with the internal key-stud provision of said by-pass fitting adjacent its inner end, and an outer or third wrench member fitted freely longitudinally slidable and rotatable on said intermediate or second wrench member and having at its forward end external radial key-stud provision for interlocking engagement with key-notch provision at the rear end of a cap-collar to be screwed forwardly on the inner end portion of said by-pass fitting.

*7. A by-pass assembly of a major transverse dimension less than the inner diameter of a service pipe for insertion completely thereinto to completely isolate the walls of an extended section thereof comprising: an open-ended imperforate tubular body of extended length having a substantially unrestricted central flow passage therethrough; means defining an exterior annular abutment surface integral with said body adjacent each end thereof; an annularly radially-expansible gasket ring seated against each said abutment surface and normally of an outer diameter slightly less than the inner diameter of the service pipe; an annular compression member threadedly engaged with each end of said body in opposition to the corresponding said abutment surface and with the corresponding said gasket ring therebetween, at least one said compression member extending beyond its corresponding end of said body and both said members having a substantially unrestricted central flow passage therethrough aligned with said body passage; radially-extending rigid means on said body exposed to said body passage and accessible from therewithin for interengagement by complementary means on a wrench device removably inserted in the assembly from one end thereof to maintain said body against rotation; rigid means on said one compression member extending radially into and accessible from within its said passage for interengagement by complementary means on the inserted wrench device to rotate said one compression member by manipulation of the wrench device to compress the corresponding gasket ring and radially expand the latter into peripheral sealing engagement with the inner surface of the service pipe; and rigid means on the other of said compression members for interengagement by complementary means on the inserted wrench device to rotate said other member by manipulation of the wrench device to compress the corresponding gasket ring and radially expand the latter into peripheral sealing engagement with the inner surface of the service pipe.*

*8. The structure defined in claim 6 wherein the said one compression member has exterior threads engaged with interior threads on the body.*

*9. The structure defined in claim 6 wherein the rigid means on the said other compression member comprises at least one slot in the end thereof remote from the corresponding gasket ring.*

MERLIN E. BARBER.

References Cited in the file of this patent or the original patent

UNITED STATES PATENTS

| Number | Name | Date |
|---|---|---|
| 282,006 | Morgan | July 24, 1883 |
| 991,663 | Stock | May 9, 1911 |
| 1,389,997 | Sedgwick | Sept. 6, 1921 |
| 1,608,620 | Robinson | Nov. 30, 1926 |
| 1,627,044 | McGeehin | May 3, 1927 |
| 2,214,177 | Raybould | Sept. 10, 1940 |
| 2,235,572 | Culbertson | Mar. 18, 1941 |
| 2,267,012 | Bowne | Dec. 23, 1941 |
| 2,268,263 | Newell et al. | Dec. 30, 1941 |

FOREIGN PATENTS

| Number | Country | Date |
|---|---|---|
| 317,421 | Italy | May 8, 1934 |